United States Patent [19]

Audureau et al.

[11] Patent Number: 5,218,046

[45] Date of Patent: Jun. 8, 1993

[54] THERMOPLASTIC COMPOSITIONS, PROCESS FOR PREPARING THEM AND THEIR APPLICATION IN THE PRODUCTION OF INDUSTRIAL ARTICLES

[75] Inventors: Joel Audureau, Noeuxles-Mines; Vincent Crenna, Pont-Ste-Maxence, both of France

[73] Assignee: Norsolor, Paris, France

[21] Appl. No.: 435,386

[22] PCT Filed: May 5, 1988

[86] PCT No.: PCT/FR88/00221

§ 371 Date: Dec. 7, 1989

§ 102(e) Date: Dec. 7, 1989

[87] PCT Pub. No.: WO88/08865

PCT Pub. Date: Nov. 17, 1988

[30] Foreign Application Priority Data

May 7, 1987 [FR] France ................................. 87 06431

[51] Int. Cl.$^5$ ..................... C08L 23/26; C08L 23/18; C08L 23/10; C08L 23/04

[52] U.S. Cl. .................................. 525/194; 525/240; 525/197

[58] Field of Search ................................ 525/240, 194

[56] References Cited

U.S. PATENT DOCUMENTS

| | | | |
|---|---|---|---|
| 4,375,531 | 3/1983 | Ross | 525/93 |
| 4,486,579 | 12/1984 | Machon et al. | |
| 4,489,034 | 12/1984 | Danison | 525/240 |
| 4,514,534 | 4/1985 | DiNardo | 524/108 |
| 4,603,173 | 7/1986 | Mack et al. | 525/194 |
| 4,614,764 | 9/1986 | Colombo et al. | 525/72 |
| 4,732,940 | 3/1988 | Yamaoka et al. | 525/194 |
| 4,748,206 | 5/1988 | Nogiwa et al. | 525/88 |
| 4,861,834 | 8/1989 | Audureau et al. | |

FOREIGN PATENT DOCUMENTS

| | | |
|---|---|---|
| 1199746 | 1/1986 | Canada . |
| 0052557 | 5/1982 | European Pat. Off. . |
| 2519007 | 7/1983 | France . |
| 2529563 | 1/1984 | France . |
| 58-210949 | 8/1983 | Japan . |

Primary Examiner—Carman J. Seccuro, Jr.
Attorney, Agent, or Firm—Finnegan, Henderson, Farabow, Garrett & Dunner

[57] ABSTRACT

The compositions contain a) less than 90% and at least 2% by weight of at least one ethylene polymer (A), and optionally, at least one α-olefin having from 3 to 12 carbon atoms, said polymer containing at least 70% in moles of patterns derived from ethylene, and b) more than 10% and up to 98% by weight of at least one polymer (B) containing at least 85% in moles of patterns derived from at least one α-olefin having from 3 to 12 carbon atoms and at the most 15% in moles of patterns derived from ethylene, and are characterized in that the polymer (A) is a modified polymer of which the measured limit viscosity is comprised between 1.3 and 100 times its limit viscosity calculated from the distribution of molecular masses. The compositions are obtained by a process consisting in providing a polymer of ethylene and, optionally, of at least one α-olefin having from 3 to 12 carbon atoms in the presence, on the one hand, of at least one initiator of free radicals in a quantity comprised between 0,001 and 0.3 parts by weight of the initiator for one hundred parts by weight of said polymer at a temperature higher than the melting temperature of said polymer during a time at least equal to one tenth of the half life time of the initiator at the temperature considered, and, on the other hand, of at least one polymer (B). Application to the production of industrial articles by extrusion-blowing of sheaths or hollow bodies, extrusion of films by means of flat dies, roto-moulding, injection or coating.

7 Claims, No Drawings

THERMOPLASTIC COMPOSITIONS, PROCESS FOR PREPARING THEM AND THEIR APPLICATION IN THE PRODUCTION OF INDUSTRIAL ARTICLES

Compositions consisting of ethylene polymers and polypropylene are already known.

Thus, document FR-A-2,529,563 describes compositions comprising from 10 to 40% by weight of isotactic polypropylene and from 60 to 90% by weight of at least one copolymer of ethylene and α-olefins containing at least 4 carbon atoms, with a relative density of between 0.905 and 0.940 and a melt index of between 0.2 and 3 dg/min, the content of α-olefin units in the copolymer being between 1 and 8 mol %. These compositions permit the manufacture of monooriented filaments exhibiting, in particular, a high tenacity.

Furthermore, document EP-A-0,052,557 describes compositions which have an improved impact strength and which contain from 40 to 98% by weight of isotactic polypropylene and from 2 to 60% by weight of a copolymer with a relative density not exceeding 0.935, obtained from 85 to 96% by weight of ethylene and from 4 to 15% by weight of at least one α-olefin.

Document FR-A-2,519,007 (U.S. Pat. No. 4,486,579) also discloses modified copolymers of ethylene and of at least one α-olefin containing from 3 to 12 carbon atoms, containing from 0.5 to 10 mol % of units derived from the said α-olefin, which are characterized in that their measured limiting viscosity is between 1.5 and 10 times their limiting viscosity calculated from the molecular mass distribution.

A way has now been found of obtaining thermoplastic compositions exhibiting improved mechanical properties, in particular low-temperature resilience, elongation at break and tensile strength, when compared with the known compositions, by using in combination with the polypropylene, instead of a copolymer of ethylene and α-olefins, a polyethylene or an ethylene/α-olefin co-polymer prepared by Ziegler catalysis and subjected to a modification such that the ratio of its measured and calculated limiting viscosities lies within a certain range.

The subject of the present invention is a thermoplastic composition containing:

a) less than 90% and at least 2% by weight of at least one polymer (A) of ethylene and, where appropriate, of at least one α-olefin containing from 3 to 12 carbon atoms, the said polymer containing at least 70 mol % of units derived from ethylene, and b) more than 10% and up to 98% by weight of at least one polymer (B) containing at least 85 mol % of units derived from at least one α-olefin containing from 3 to 12 carbon atoms and not more than 15 mol % of units derived from ethylene, which composition is characterized in that the polymer (A) is a modified polymer whose measured limiting viscosity is between 1.3 and 100 times its limiting viscosity calculated from the molecular mass distribution.

Polymer (A) is intended to mean a polymer obtained by homopolymerization of ethylene or by copolymerization of ethylene with at least one α-olefin containing from 3 to 12 carbon atoms in the presence of a Ziegler-type catalyst system comprising, for example, at least one catalyst based on a transition metal of groups IVB to VIB of the Periodic Classification and, where appropriate, at least one activator comprising a hydride and/or an organometallic derivative of a metal of groups IA to IIIA of the Periodic Classification, and modified, for example, by the action of a small quantity of at least one free radical initiator, so that its measured limiting viscosity lies between 1.3 and 100 times its limiting viscosity calculated from the molecular mass distribution. These concepts of modification and of limiting viscosities are described in detail in the document FR-A-2,519,007. The modification of the ethylene homopolymer or copolymer may also be carried out by dispersing the free radical initiator, before it acts upon the said homopolymer or copolymer, in a polymeric phase comprising at least one polymer containing at least 90 mol % of units derived from at least one α-olefin containing from 3 to 12 carbon atoms and not more than 10 mol % of units derived from ethylene, the said phase being present in such quantity that its proportion in the resulting composition is between 0.2 and 10% by weight.

The polymer (A) generally has a relative density (determined according to ASTM standard 1505) of between 0.86 and 0.97. Depending on the intended application, a polymer which is predominantly rather crystalline or predominantly rather amorphous will be chosen.

The polymer (A) generally has a standard melt index (measured according to ASTM standard D 1238 - condition E) chosen between 0.05 and 150 dg/min, advantageously between 10 and 30 dg/min when the compositions are intended to be converted by injection moulding, advantageously between 0.2 and 2 dg/min when the compositions are intended to be converted into films, particularly by blow-extrusion of tubular bubbles.

The α-olefin forming part of the constitution of the copolymers (A) is advantageously chosen from propylene, 1-butene, 1-pentene, 1-hexene, 4-methyl-1-pentene, 1-octene and mixtures thereof.

The polymer (B) may be, in particular, polypropylene (particularly isotactic polypropylene), poly-1-butene, poly(4-methyl-1-pentene), a poly(propylene-ethylene) or a poly(1-butene-ethylene) containing at least 85 mol % of units derived from propylene or 1-butene respectively, a poly(propylene/1-butene/ethylene) containing less than 15 mol % of units derived from ethylene, or a poly(propylene-1-butene). The polymer (B) advantageously has a melt index (according to ASTM standard D 1238 at 230° C. under a 5 kg load) of between 0.2 and 150 dg/min.

Another subject of the present invention is a process for preparing a composition such as described above, characterized in that it consists in bringing a polymer of ethylene and, where appropriate, of at least one α-olefin containing from 3 to 12 carbon atoms, into contact with
  on the one hand, at least one free radical initiator, in a quantity of between 0.001 and 0.3 parts by weight of initiator per 100 parts by weight of the said polymer at a temperature above the melting temperature of the said polymer, for a period greater than or equal to one tenth of the half-life of the initiator at the temperature in question, and
  on the other hand, at least one polymer (B).

Bringing the said polymer into contact with the free radical initiator enables a modified polymer (A) to be obtained.

According to a first alternative form of the process according to the invention, the polymer (B) is added to the modified polymer (A) after the latter has been obtained. This operating procedure means that the modified polymer (A) is prepared in a first step, for example according to a technique such as that described in document FR-A-2,519,007 and then the polymer (B) is added to it in a second step. This addition may take place in a mixer or a machine for converting plastics such as an extruder. Advantageously, each of the polymers (A) and (B) is reduced to a finely divided state, for example into the form of granules which are then blended dry and which thus provide a composition which is ready for use. It is also possible to compound the mixture of the polymers (A) and (B) and to extrude it hot, and to convert the composition directly into finished objects, or to granulate it.

According to another alternative form of the process according to the invention, the free radical initiator is dispersed in at least one fraction of the polymer (B) at a temperature below the decomposition temperature of the said initiator, before it is brought into contact with the polymer of ethylene and, where appropriate, of α-olefin, to be modified. The dispersion of the initiator in at least one fraction of the polymer (B) is produced by any known means, chosen as a function of the physical state of the constituents and/or of the device chosen for bringing the dispersion of the initiator into contact with the polymer to be modified. If the polymer (B) needs to be heated, the operation is advantageously carried out by compounding at such a temperature that the free radical initiator does not decompose or is only slightly affected. The dispersion obtained is then brought into contact with the polymer to be modified and, where appropriate, with a complementary quantity of polymer (B) so as to obtain the desired composition, advantageously in a machine for converting polymers, such as a kneader or a single-screw or twin-screw extruder. This bringing into contact may be carried out according to a noncontinuous process; the polymer to be modified, which is in the form of powder of particle size preferably between 1 and 500 μm or of granules is then introduced into the conversion machine simultaneously with the initiator dispersion and, where appropriate, the complementary quantity of polymer (B). The initiator dispersion may also be homogenized beforehand with the polymer to be modified and, where appropriate, with the complementary quantity of polymer (B), for example by powder or granulate blending, the homogeneous mixture being then introduced into the conversion machine. This bringing into contact may also be carried out continuously and directly in a unit for manufacturing the (co)polymer to be modified.

According to a third alternative form of the process according to the invention, the polymer to be modified is mixed with at least one fraction of the polymer (B) before it is brought into contact with the free radical initiator. This operation may be carried out, for example, by combining extruders in series.

According to a fourth alternative form, the bringing of the free radical initiator into contact with the polymer to be modified takes place simultaneously with the bringing into contact with the polymer (B), for example by dry blending. The blend obtained is then extruded at the usual temperature and for a usual time in order to produce the composition according to the invention.

Among the free radical initiators which are suitable for implementing the process according to the invention there may be mentioned, in particular:

peroxygen compounds such as, for example, peroxides, peresters and hydroperoxides, diazo compounds such as an 2,2'-azobis(acyloxyalkane) like 2,2'-azobis(acetoxypropane) and 2,2'-azobis(2-acetoxy-4-methylpentane), or such as 1,1'-azobis(1-formyloxycyclohexane), and hydrocarbons containing labile carbon-carbon bonds such as, for example, diaryldialkylalkanes, like 2,3-diphenyl-2,3-dimethylbutane (commonly referred to by the name biscumyl) or 3,4-diphenyl-3,4-dimethylhexane.

The quantity of initiator to be employed depends on the degree of modification which it is intended to impart to the polymer to be modified. For a given degree of modification it varies proportionately to the molecular mass of the initiator.

According to their melt index, the compositions according to the invention may be converted into industrial articles by techniques which are as diverse as:

in the case of a standard melt index (MI) of approximately between 0.1 and 3: blow-extrusion of bubbles or of hollow bodies and film extrusion using a flat die, in the case of a standard melt index of approximately 2 and 10: rotational moulding and injection blow-moulding of hollow bodies, in the case of a standard melt index of approximately between 10 and 100: injection moulding and coating.

The following nonlimiting examples are intended to illustrate the invention.

I. Polymers employed.

The polymers to be modified (P) which were employed were the products described in Table I below with the indication of their molar content $C_2$ of units derived from ethylene (expressed in percent), their relative density d (according to ASTM standard D 1505) and their melt index MI (measured according to ASTM standard D 1238 at 190° C. under 2.16 kg, and expressed in dg/min). These polymers (P) are marketed by CdF Chimie Ethylene et Plastiques under the names which also appear in Table I. The polymers P1 to P3 are copolymers of ethylene and of 1-butene. The polymers P4, P5 and P6 are terpolymers of ethylene, propylene and 1-butene.

The polymer (B) employed was either a propylene homopolymer marketed under the name Hostalen 1770 PPT and having a melt index of 30 dg/min according to ASTM standard D 1238 at 230° C. under 5 kg, referred to hereinafter as B1, or a random propylene/ethylene copolymer containing 14 mol % of units derived from ethylene, marketed under the name Vestolen P 2300 and having a melt index of 15 dg/min according to ASTM standard D 1238, at 230° C. under 2.16 kg, referred to hereinafter as B2.

II. Conversion by injection.

1. Injection conditions.

All the compositions were prepared by compounding in a single-screw extruder under the same temperature conditions for a given starting polymer. The blends were then converted into test specimens by injection into a mould at 20° C., according to a temperature profile of 210° C.-200° C.-190° C. and at an injection pressure of 950 bars.

2. Measurements carried out.

The following were measured on the test specimens obtained, of standardized dimensions:

the impact strength (IS) determined: either according to ISO standard R 179 on notched test specimens, at −20° C. or −40° C., (referred to hereinafter as LS), expressed in kj/m², or according to French standard NFT 51118 (instrumented multiaxial impact, referred to hereinafter as IMI) on test specimens 1.7 mm in thickness, expressed by the force (F) at the point of failure, in newtons, and the energy (E) at the point of failure in joules at 23° C., or else the elongation at break EB determined according to ASTM standard D 638, and expressed in %.

EXAMPLES 1 to 8 (COMPARATIVE)

Compounds made up of polymers to be modified and of the polymer (B) were prepared according to the specifications in Table II below, which also lists the results of the measurements which relate to them. The tensile strength in the lengthwise direction LTS, determined according to ASTM standard D 638, of a composition containing 80% by weight of polymer (P1) and 20% by weight of polymer (B1) is 155 daN/cm$^2$. The tensile strength of a composition containing 80% by weight of polymer (P4) and 20% by weight of polymer (B1) is 89 daN/cm$^2$ in the lengthwise direction (LTS) and 105 daN/cm$^2$ in the transverse direction (TTS).

EXAMPLES 9 TO 27

The compositions according to the invention were prepared by using, as free radical inititator, a 2,2'-azobis(acetoxypropane) marketed under the name Luazo AP (AP hereinafter) in the case of Examples 9 to 12 and 22 to 27, or α,α'-bis(tert-butylperoxy)diisopropylbenzene marketed under the name Perkadox Y 14/96 (Y hereinafter) in the case of Examples 14, 16, 18, 20 and 21, and by following either of the operating methods described below.

a) First operating method (Examples 9 to 20):

Each of the polymers (A)n was prepared by adding to the corresponding polymer to be modified (P)n a proportion (expressed in ppm and specified in Tables III and IV) of the initiator dispersed beforehand in a quantity of polymer (B) representing approximately 1 to 2% by weight relative to the polymer (P) in a single-screw extruder with a temperature profile of 230°–290° C. (for the initiator AP) and with a temperature profile of 170°–220° C. (for the initiator Y) and for a contact time of 3 min. The ratio $\eta_o^m/\eta_o^c$ of its measured limiting viscosity to its calculated limiting viscosity is shown in Tables III and IV below.

The polymer (A) thus obtained was mixed with the polymer (B) in a single-screw extruder at a temperature of 240° C. and for a period of 2 min, in the proportion by weight shown in Tables III and IV. The properties of the compositions obtained are also shown in the same tables. Examples 13, 15, 17 and 19 are comparative (unmodified copolymers P).

The tensile strength (LTS) values of compositions obtained according to this first operating method, containing 80% by weight of polymer (A1) and 20% by weight of polymer (B1) are, respectively, 173 daN/cm$^2$ if the polymer (A1) has been obtained by modifying the polymer (P1) with 200 ppm of initiator AP, and 203 daN/cm$^2$ if the polymer (A1) has been obtained by modifying the polymer (P1) with 375 ppm of the same initiator. Similarly, the tensile strength values of compositions containing 80% by weight of polymer (A4) and 20% by weight of polymer (B1) are, respectively: LTS=105 daN/cm$^2$ and TTS=125 daN/cm$^2$ if the polymer (A4) had been obtained by modifying the polymer P4 with 450 ppm of initiator AP; they are LTS=103 daN/cm$^2$ and TTS=140 daN/cm$^2$ if the polymer (A4) has been obtained with 850 ppm of the same initiator. The elongation at break, in the lengthwise direction, of the composition of Example 9 is 300%.

b) Second operating method (Examples 21 to 27)

A dispersion of the free radical initiator in a fraction of the polymer (B) was prepared in a first step by dry blending. This dispersion was then mixed with granules of polymer (B) and with granules of the polymer to be modified (P) in such quantities that the weight percentage of (B) in the final composition and that the proportion of initiator (expressed in ppm) relative to the polymer to be modified should be those specified in Table V. This granulate blend was extruded in a single-screw extruder with a temperature profile of 230°–290° C. (for initiator AP) and with a temperature profile of 170°–220° C. (for initiator Y) and over a period of 3 min. This produced the compositions which appear in Table V, where the results of the measurements carried out have also been shown.

III-Conversion into films by bubble blow-extrusion

1. Conditions of blow-extrusion

A Kiefel model 60 extruder fitted with an annular die permitting films of 50 μm thickness to be manufactured was employed. The blow ratio of the bubble (ratio of the bubble diameter to the die diameter) is 3. The bubble is cooled with air at 20° C. at the die exit.

2. Measurements carried out

The maximum permissible output Q, up to which the blown bubble is stable was determined for blow-extrusion. It is expressed in kg of composition per hour.

The following were measured on the films obtained, 50 μm in thickness:

the impact strength Si, according to ASTM standard D 1709, expressed in grams, and the stiffness, expressed by means of the secant modulus at 1% elongation in the lengthwise direction (LSM) determined according to the NF standard T 54102 and expressed in daN/cm$^2$.

EXAMPLES 28 TO 31

To begin with, compositions were prepared containing, on the one hand, a copolymer of ethylene and 1-butene marketed by CdF Chimie Ethylène et Plastiques under the name Lotrex FC 1010, containing 96 mol % of units derived from ethylene, having a melt index of 1 dg/min and a relative density of 0.918 and, on the other hand, the copolymer B2 already described above.

The ethylene/1-butene copolymer present in these compositions was modified with 170 ppm of initiator AP, predispersed in a fraction of the polymer B2 in a proportion of 2.5%, in a single-screw extruder at 190° C. The composition obtained was then granulated and the granulates were converted into films as indicated above.

Summarized in Table VI are the characteristics of the compositions employed (melt index (MI) according to ASTM standard D 1238 at 190° C. under 2.16 kg and relative density (d)) and the results obtained.

The results of Examples 30 and 31, given by way of comparison, were obtained using ethylene/1-butene copolymers which had the same stiffness as the compositions of Examples 28 and 29 according to the invention, respectively. It was found that, at equivalent stiffness, the compositions according to the invention permit the extrusion rate to be increased and the impact strength of the films obtained to be improved.

Unmodified compositions result in maximum outputs similar to those of ethylene/1-butene copolymers employed alone.

TABLE I

| Polymer to be modified | Trade name | % C$_2$ | d | MI |
|---|---|---|---|---|
| P1 | LOTREX MY 1610 | 99.8 | 0.960 | 16 |
| P2 | LOTREX MG 2200 | 98.2 | 0.940 | 20 |
| P3 | LOTREX MC 2300 | 96 | 0.920 | 20 |
| P4 | NORSOFLEX MW 1960 | 89.3 | 0.900 | 14 |
| P5 | NORSOFLEX FW 1900 | 88 | 0.900 | 1 |
| P6 | NORSOFLEX MW 2438 | 75.7 | 0.870 | 2 |

TABLE II

| Example | Nature of the polymer (P) | % by weight of polymer (B) | MI | IS | EB L | EB T |
|---|---|---|---|---|---|---|
| 1 | P3 | 20 | 14 | 4.8* | 200 | 360 |
| 2 | P4 | 20 | 11 | 14** | | |
| 3 | P4 | 40 | 8 | 10* / 5** | | |
| 4 | P2 | 20 | 15 | | 240 | 180 |
| 5 | P1 | 40 | 8.5 | | 46 | 37 |
| 6 | P2 | 40 | 11 | | 52 | 67 |
| 7 | P3 | 40 | 10 | | 76 | 60 |
| 8 | P5 | 80 | 3.9 | 1.6* | 265 | 828 |

TABLE III

| Example | (A) | AP | $\eta^m_o/\eta^c_o$ (An) | % (B1) | MI | IS |
|---|---|---|---|---|---|---|
| 9 | A3 | 300 | 9 | 20 | 7.2 | 9* |
| 10 | A4 | 450 | 8 | 20 | 6.9 | 31* |
| 11 | A4 | 850 | 20 | 20 | 3.5 | 37** |
| 12 | A4 | 850 | 20 | 40 | 3.7 | 33* / 29** |

(*) at −20° C.
(**) at −40° C.

TABLE IV

| Example | (A) or (P) | Y | $\eta^m_o/\eta^c_o$ | % (B2) | IMI at 23° C. E | IMI at 23° C. F |
|---|---|---|---|---|---|---|
| 13 | P5 | — | 0.95 | 80 | 21.3 | 1210 |
| 14 | A5 | 200 | 80 | 80 | 26.7 | 1983 |
| 15 | P5 | — | 1 | 95 | 8.2 | 1470 |
| 16 | A5 | 100 | 50 | 95 | 11.2 | 2254 |
| 17 | P6 | — | 0.98 | 80 | 19.4 | 1150 |
| 18 | A6 | 750 | 95 | 80 | 27 | 1921 |
| 19 | P6 | — | 1 | 90 | 19.7 | 1350 |
| 20 | A6 | 250 | 75 | 90 | 23.2 | 2223 |

TABLE V

| Example | (A) | AP | % (B1) | MI | IS | EB L | EB T |
|---|---|---|---|---|---|---|---|
| 21 | A5 | 200(Y) | 80(B2) | 3.3 | 3.1* | 430 | |
| 22 | A3 | 450 | 20 | 7.1 | 10.5* | 340 | 540 |
| 23 | A4 | 450 | 40 | 7.5 | 28* | | |
| 24 | A2 | 400 | 20 | 5.4 | | 400 | 240 |
| 25 | A1 | 200 | 40 | 3 | | 81 | 81 |
| 26 | A2 | 400 | 40 | 4 | | 107 | 118 |
| 27 | A3 | 300 | 40 | 8 | | 284 | 345 |

(*) at −20° C.

TABLE VI

| Example | % B2 | MI | d | Q | Si | LSM |
|---|---|---|---|---|---|---|
| 28 | 11 | 0.25 | 0.916 | 152 | 205 | 2130 |
| 29 | 20 | 0.31 | 0.914 | 150 | 92 | 2650 |
| 30 | 0 | 1 | 0.925 | 116 | 125 | 2100 |
| 31 | 0 | 1 | 0.928 | 110 | 60 | 2600 |

We claim:

1. A non-crosslinked thermoplastic composition comprising:
   (a) less than 90% and at least 2% by weight of at least one polymer (A) of (i) ethylene or (ii) ethylene together with at least one α-olefin containing from 3 to 12 carbon atoms, said polymer (A) comprising at least 70 mol % of units derived from ethylene; and
   (b) more than 10% and up to 98% by weight of at least one polymer (B) containing at least 85 mol % of units derived from at least one α-olefin containing from 3 to 12 carbon atoms and not more than 15 mol % of units derived from ethylene;
   wherein said polymer (A) is a polymer modified by reaction with at least one free radical initiator, the modified polymer having a measured limiting viscosity between 1.3 and 100 times its limiting viscosity calculated from molecular mass distribution.

2. A composition according to claim 1, wherein said polymer (B) is an isotactic polypropylene.

3. A composition according to claim 1, wherein the melt index of said polymer (B), at 230° C. under a load of 5 kg, is between 0.2 and 150 dg/min.

4. A composition according to claim 1, wherein said polymer (A) has a relative density of between 0.86 and 0.97.

5. A composition according to claim 1, wherein the standard melt index of said polymer (A) is between 0.05 and 150 dg/min.

6. A composition according to claim 5, wherein said standard melt index of said polymer (A) is between 10 and 30 dg/min.

7. A composition according to claim 1, wherein, before being modified, said polymer (A) has been prepared by polymerization by means of:
   (i) a Ziegler-type catalyst system comprising at least one transition metal of groups IVA to VIA of the Periodic Classification; or
   (ii) at least one activator comprising a Ziegler-type catalyst as in (i) together with at least one organometallic derivative of a metal of groups IA to IIIA of the Periodic Classification.

* * * * *